United States Patent Office 3,322,747
Patented May 30, 1967

3,322,747
THIONOCARBONATE NUCLEOSIDES
Tsung-Ying Shen, Westfield, and William V. Ruyle, Scotch Plains, N.J., assignors to Merck & Co., Inc., Rahway, N.J., a corporation of New Jersey
No Drawing. Filed Apr. 1, 1965, Ser. No. 444,808
20 Claims. (Cl. 260—211.5)

This invention relates to nucleosides and more particularly to novel substituted nucleosides useful in the preparation of a wide variety of other nucleosides. Specifically, it relates to novel ribonucleosides having a thionocarbonate grouping at the 2',3'-position of the ribose moiety, to novel methods for preparing them, and to novel methods for converting them into other nucleosides.

It is an object of the present invention to provide novel thionocarbonate nucleosides which may be converted into a variety of nucleosides.

It is another object of the invention to provide novel processes for obtaining said novel thionocarbonates.

It is a further object of the invention to provide an overall process for the convenient conversion of a riboside to an arabinoside.

These and other objects will appear from the detailed description which follows.

The novel compounds of the present invention have the following structural formula

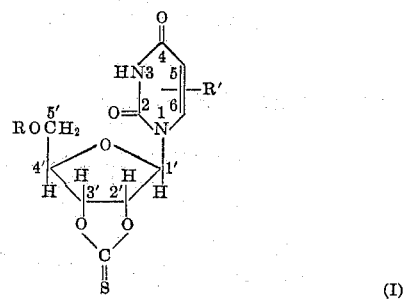

(I)

wherein R is the acyl residue of an organic carboxylic acid, alkyl, or aralkyl, and R' is hydrogen, halogen, alkyl, amine, alkylamine such as methylamine, dimethylamine, propylamine, and the like, or trifluoromethyl. In general, compounds I may be termed 1-(5'-O-R-β-D-ribofuranosyl)-5 or 6-(R'-uracil-2',3'-O-thionocarbonates. Typical of the foregoing R groups are alkyl such as methyl, ethyl, butyl, and pentyl, aralkyl such as trityl, benzyl, p-nitrobenzyl, and p-chlorobenzyl, and acyl groups such as those derived from organic carboxylic acids, which groups are exemplified by acetyl, propionyl, butyryl, benzoyl, substituted benzoyl such as p-nitrobenzoyl and p-chlorobenzoyl, and the like. Illustrative of compounds I are 1-(5'-O-trityl-β-D-ribofuranosyl)-uracil-2',3'-O-thionocarbonate,
1-(5'-O-trityl-β-D-ribofuranosyl)-5-chlorouracil-2',3'-O-thionocarbonate,
1-(5'-O-trityl-β-D-ribofuranosyl)-5-methylaminouracil-2',3'-O-thionocarbonate,
1-(5'-O-trityl-β-D-ribofuranosyl)-5-methyluracil-2',3'-O-thionocarbonate,
1-(5'-O-trityl-β-D-ribofuranosyl)-5-trifluoromethyluracil-2',3'-O-thionocarbonate,
1-(5'-O-benzyl-β-D-ribofuranosyl)-uracil-2',3'-O-thionocarbonate,
1-(5'-O-benzyl-β-D-ribofuranosyl)-5-bromouracil-2',3'-O-thionocarbonate,
1-(5'-O-benzyl-β-D-ribofuranosyl)-5-aminouracil-2',3'-O-thionocarbonate,
1-(5'-O-acetyl-β-D-ribofuranosyl)-uracil-2',3'-O-thionocarbonate,
1-(5'-O-acetyl-β-D-ribofuranosyl)-5-trifluoromethyluracil-2',3'-O-thionocarbonate,
1-(5'-O-benzoyl-β-D-ribofuranosyl)-uracil-2',3'-O-thionocarbonate,
1-(5'-O-benzoyl-β-D-ribofuranosyl)-5-bromouracil-2',3'-O-thionocarbonate, and
1-(5'-O-benzoyl-β-D-ribofuranosyl)-5-ethyluracil-2',3'-O-thionocarbonate.

Preferred among the foregoing are the compounds wherein R is trityl and most preferred is 1-(5'-O-trityl-β-D-ribofuranosyl)-uracil-2',3'-O-thionocarbonate.

In general, the compounds of the present invention are prepared by treating the appropriate ribonucleoside, suitably protected at the 5'-O-position preferably, as mentioned previously, with the trityl group, with a thionocarbonate generating system such as is obtained from thiophosgene in the presence of a tertiary amine such as pyridine, triethylamine, N-ethylpiperidine, and the like. Such ribonucleosides are shown as compounds II below. Alternatively, and preferably, the thionocarbonate generating material is bis-(imidazol-1-yl)-thione. The reaction should be carried out at less than about 110 C. and preferably between 0 and 30° C. In this regard, it has been discovered that at temperatures higher than 110° C. further reactions occur resulting in the formation of the O²,2',3'-anhydro nucleoside. The following diagram illustrates the formation of compounds I.

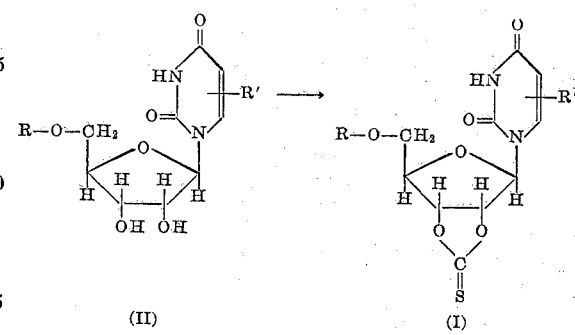

wherein R and R' are as previously defined. The reaction is preferably carried out in a solvent such as tetrahydrofuran, dioxane, diethylether, ethylacetate, or 1,2-dimethoxyethane. As a result of this step, the product is obtained as a solid and may be isolated, if desired, by techniques well known in the art.

Compounds I are versatile materials and can be converted to a variety of known and useful compounds. For example, they may be treated at elevated temperatures in the presence of a base to form the cyclonucleosides of the formula

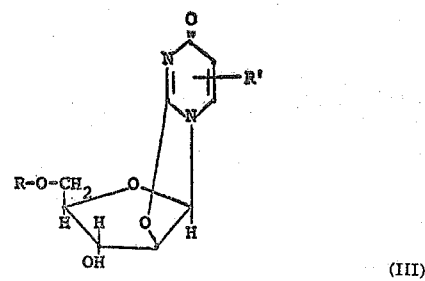

(III)

wherein R and R' are as previously defined. This may be done in the same reaction system employed for the formation of compounds I merely by increasing the temperature of the system to point of reflux or by directly heating compounds II. As the base there may be employed slight excesses of the bis-imidazolyl reagent, although any other base may be employed. In this regard, the reaction proceeds readily in the presence of even very weak bases. It will be appreciated by those skilled in the art that the imidazolyl reagent is itself a very weak base. Compounds III are generally termed $O^2$-2′-anhydro-1-(5′-O-R-β-D-ribofuranosyl)-uracils. They may be hydrolyzed, preferably with acid, to cleave the 2,2′-oxygen-ether linkage and form the hydroxyl group at the 2′-position in the arabinose form. They may then be converted, in accordance with known techniques, to compounds such as cytosine arabinoside which is a known antiviral, antibacterial compound.

Compounds I may also be converted to 2′,3′-dideoxyriboside-2′,3′-olefins of the formula

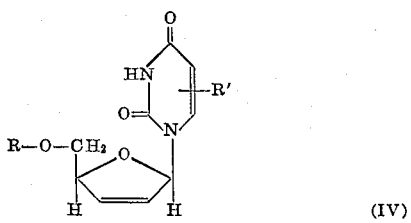

(IV)

where R and R′ are as previously defined. This may be done by reducing compounds I preferably using Raney nickel as a catalyst in the presence of suitable solvents such as ketones as, for example, acetone, methylethylketone, and the like; esters such as ethylacetate; alkanols such as methanol and ethanol; and the like. The temperature of conversion is suitably the reflux temperature of the particular system employed. The conversion may be effected without the prior isolation of compounds I and thus represents a short, convenient method for the preparation of 2′,3′-dideoxyriboside directly from the riboside. There is also obtained in the reaction mixture varying amounts of compounds III, depending on the amount of alkalinity introduced into the system. Thus, the presence of residual alkalinity in the Raney nickel will cause the cyclonucleoside to form. Minimizing this alkalinity will promote high yields of compounds IV. The two components, when formed, may be separated by fractional crystallization, chromatography, and the like.

Compounds IV wherein R′ is R″ and R″ is chloro, trifluoromethyl, amino, alkyl having two or more carbon atoms, alkylamino, or dialkylamino such as methylamino, ethylamino, butylamino, dimethylamino, dibutylamino, and the like, are novel and are antimicrobial agents, are useful in the preparation of potent antimetabolites and are, therefore, useful in the study of metabolic and biological systems. Such compounds are represented by 1-(5′-O-trityl-β-D-ribofuranosyl)-2′,3′-dideoxy-2′,3′-didehydro-5-chlorouracil,
1-(5′-O-trityl-β-D-ribofuranosyl)-2′,3′-dideoxy-2′,3′-didehydro-5-aminouracil,
1-(5′-O-trityl-β-D-ribofuranosyl)-2′,3′-dideoxy-2′,3′-didehydro-5-trifluoromethyluracil,
1-(5′-O-trityl-β-D-ribofuranosyl)-2′,3′-dideoxy-2′,3′-didehydro-5-methylaminouracil,
1-(5′-O-trityl-β-D-ribofuranosyl)-2′,3′-dideoxy-2′,3′-didehydro-5-dimethylaminouracil,
1-(5′-O-benzyl-β-D-ribofuranosyl)-2′,3′-dideoxy-2′,3′-didehydro-5-chlorouracil,
1-(5′-O-benzyl-β-D-ribofuranosyl)-2′,3′-dideoxy-2′,3′-didehydro-5-aminouracil, and
1-(5′-O-acetyl-β-D-ribofuranosyl)-2′,3′-dideoxy-2′,3′-didehydro-5-methylaminouracil.

Alternatively, compounds I may be treated with an alkylphosphite to form the novel $N^3$-alkylated compounds of the formula

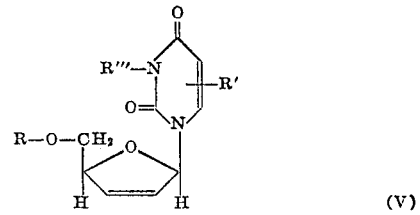

(V)

where R‴ is the alkyl group corresponding to the alkylphosphite used and R and R′ are as previously defined. The preferred phosphite is trimethylphosphite, although other alkyl phosphites such as the triethyl and tributyl compounds may be employed as desired. Representative of compounds V which are useful, as are compounds IV, are the following:

1-(5′-O-trityl-β-D-ribofuranosyl)-2′,3′-dideoxy-2′,3′-didehydro-3-methyluracil,
1-(5′-O-trityl-β-D-ribofuranosyl)-2′,3′-dideoxy-2′,3′-didehydro-3-methyl-5-chlorouracil,
1-(5′-O-benzyl-β-D-ribofuranosyl)-2′,3′-dideoxy-2′,3′-didehydro-3-ethyluracil,
1-(5′-O-benzyl-β-D-ribofuranosyl)-2′,3′-dideoxy-2′,3′-didehydro-3-ethyl-5-methylaminouracil, and the like.

The preferred compound is 1-(5′-O-trityl-β-D-ribofuranosyl-2′,3′-dideoxy-2′,3′-didehydro-3-methyluracil.

The following examples are given for the purpose of illustration only and are not intended to limit the scope of the invention.

EXAMPLE 1

*1-(5′-O-trityl-β-D-ribofuranosyl)-uracil-2′,3′-O-thionocarbonate*

A solution of 1-(5′-O-trityl-β-D-ribofuranosyl)-uracil (0.486 g. 1 mmole) and bis-(imidazol-1-yl)-thione (0.2 g., 1.1 mmoles) in 5 ml. of tetrahydrofuran is kept at 25° C. for five days. The crude product is precipitated with petroleum benzin, then taken up in chloroform and washed with water. After removal of solvent, the product is redissolved in ether, and a small amount of insoluble material removed by filtration. Hexane is added to the filtrate to precipitate 350 mg. of 1-(5′-O-trityl-β-D-ribofuranosyl)-uracil-2′,3′-O-thionocarbonate.

*Analysis.*—Calc. for $C_{29}H_{24}O_6N_2S$: C, 65.90; H, 4.58; N, 5.30; S, 6.00. Found: C, 66.19; H, 4.78; N, 5.60; S, 5.78.

When the foregoing procedure is repeated replacing 1-(5′-O-trityl-β-D-ribofuranosyl)-uracil with equivalent amounts of 1-(5′-O-trityl-β-D-ribofuranosyl)-5-chlorouracil,
1-(5′-O-trityl-β-D-ribofuranosyl)-5-methylaminouracil,
1-(5′-O-trityl-β-D-ribofuranosyl)-5-methyluracil,
1-(5′-trityl-β-D-ribofuranosyl)-5-trifluoromethyluracil,
1-(5′-O-benzyl-β-D-ribofuranosyl)-5-uracil, or
1-(5′-O-acetyl-β-Dribofuranosyl)uracil, there is obtained 1-(5′-O-trityl-β-D-ribofuranosyl)-5-chlorouracil-2′,3′-O-thionocarbonate,
1-(5′-O-trityl-β-D-ribofuranosyl)-5-methylaminouracil-2′,3′-O-thionocarbonate,
1-(5′-O-trityl-β-D-ribofuranosyl)-5-methyluracil-2′,3′-O-thionocarbonate,
1-(5′-O-trityl-β-D-ribofuranosyl)-5-trifluoromethyluracil-2′,3′-O-thionocarbonate,
1-(5′-O-benzyl-β-D-ribofuranosyl)-uracil-2′,3′-O-thionocarbonate, or
1-(5′-O-acetyl-β-D-ribofuranosyl)-uracil-2′,3′-O-thionocarbonate, respectively.

EXAMPLE 2

O²,2-anhydro-1-(5'-O-trityl-β-D-ribofuranosyl)-uracil

A mixture of 0.486 g. (1mmole) of 1-(5'-O-trityl-β-D-ribofuranosyl)-uracil and 0.2 g. (1.1 mmoles) of bis-(imidazol-1-yl)-thione in 5 ml. of toluene is heated at reflux for 30 minutes. The crude product, which separates from the cooled reaction mixture, is recrystallized from absolute ethanol to yield 86% of O²,2'-anhydro-1-(5'-O-trityl-β-D-ribofuranosyl)-uracil, M.P. 217–220° C.

The same compound is obtained in good yield when the 2',3'-O-thionocarbonate of the uracil starting material is heated in toluene with two molecular equivalents of the imidazole.

The corresponding cyclonucleosides are obtained when equivalent amounts of 1-(5'-O-trityl-β-D-ribofuranosyl)-5-chlorouracil,
1-(5'-O-trityl-β-D-ribofuranosyl)-5-methylaminouracil,
1-(5'-O-trityl-β-D-ribofuranosyl)-5-methyluracil,
1-(5'-O-trityl-β-D-ribofuranosyl)-5-trifluoromethyluracil,
1-(5'-O-benzyl-β-D-ribofuranosyl)-uracil, or
1-(5'-O-acetyl-β-D-ribofuranosyl)-uracil are used in place of 1-(5'-O-trityl-β-D-ribofuranosyl)-uracil.

EXAMPLE 3

1-(5'-O-trityl-β-D-ribofuranosyl)-2',3'-dideoxy-2',3'-didehydrouracil

Raney nickel (1.5 g.) is boiled with 75 ml. of acetone, 15 ml. of ethanol, and 1 ml. of ethylacetate for two hours. After addition of 1.6 g. of 1-(5'-O-trityl-β-D-ribofuranosyl)-uracil-2',3'-O-thionocarbonate, refluxing is continued for six hours. From the reaction mixture 400 mg. of O²,2' - anhydro - 1 - (5' - O - trityl - β - D - ribofuranosyl)-uracil and 250 mg. of 1-(5'-O-trityl-β-D-ribofuranosyl)-2',3'-dideoxy-2',3'-didehydrouracil are obtained. Fractional crystallization followed by chromatography on silica gel achieves the separation of the two components.

Similarly, the corresponding dideoxy compounds are obtained when in place of the uracil starting material in the above procedure there is employed equivalent amounts of 1-(5'-O-trityl-β-D-ribofuranosyl-5-chlorouracil-2',3'-O-thionocarbonate,
1-(5'-O-trityl-β-D-ribofuranosyl)-5-methylaminouracil-2',3'-O-thionocarbonate,
1-(5'-O-trityl-β-D-ribofuranosyl)-5-methyluracil-2',3'-O-thionocarbonate,
1-(5'-O-trityl-β-D-ribofuranosyl)-5-trifluoromethyluracil-2',3'-O-thionocarbonate,
1-(5'-O-benzyl-β-D-ribofuranosyl)-uracil-2',3'-O-thionocarbonate, or
1-(5'-O-acetyl-β-D-ribofuranosyl)-uracil-2',3'-O-thionocarbonate.

EXAMPLE 4

1-(5'-O-trityl-β-D-ribofuranosyl)-2',3'-dideoxy-2',3'-didehydro-N³-methyluracil When 1-(5'-O-trityl-β-D-ribofuranosyl)-uracil-2',3'-O-thionocarbonate is refluxed in xylene with trimethylphosphite for 65 hours, 1-(5'-O-trityl-β-D-ribofuranosyl)-2',3'-dideoxy-2',3'-didehydro-N³-methyluracil is obtained as an amorphous product and is characterized by NMR.

*Analysis.*—Calc. for $C_{29}H_{26}N_2O_4$: C, 74.66; H, 5.62; N, 6.01. Found: C, 74.03; H, 5.80; N, 6.16.

Similarly, the corresponding N³-alkyl compounds are obtained when the trimethylphosphite in the above procedure is replaced by equivalent amounts of triethylphosphite, tripropylphosphite, or tributylphosphite.

Any departure from the above description which conforms to the present invention is intended to be included within the scope of the claims.

What is claimed is:

1. The process for preparing a compound of the formula:

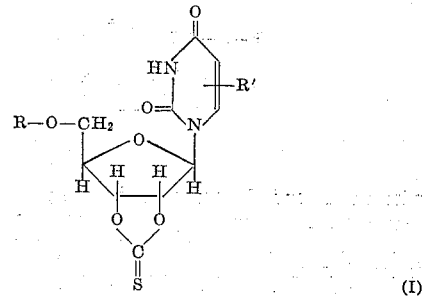

wherein R is an acyl radical of the formula R²CO— where R² is lower alkyl or phenyl; lower alkyl; or methyl substituted by at least one phenyl group; R' is hydrogen, halogen, lower alkyl, amino, lower alkylamino, di(lower alkyl)amino or trifluoromethyl, which comprises treating a compound of the formula:

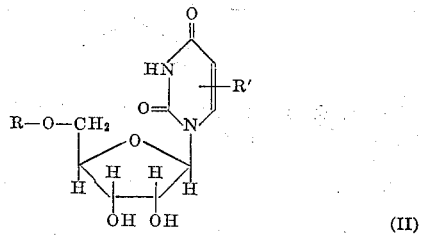

wherein R and R' are as defined above, with a thionocarbonate generating material at a temperature of less than 110° C.

2. The process according to claim 1 wherein the thionocarbonate generating material is bis - (imidazol - 1 - yl)-thione.

3. The process according to claim 2 wherein the temperature of reaction is between 0 and 30° C.

4. The process for preparing a compound of the formula:

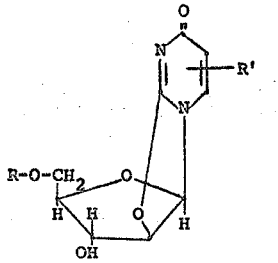

wherein R is an acyl radical of the formula R²CO— wherein R² is lower alkyl or phenyl; lower alkyl; or methyl substituted by at least one phenyl group; R' is hydrogen, halogen, lower alkyl, amino, lower alkylamino, di(lower alkyl)amino or trifluoromethyl, which comprises heating a compound of the formula:

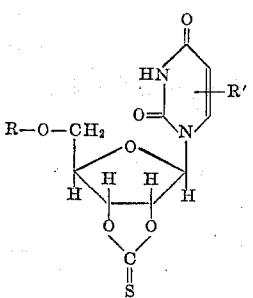

or

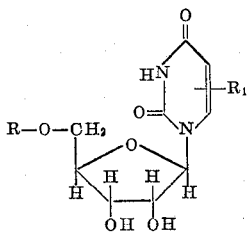

(II)

wherein R and R' are as defined above, at an elevated temperature and in the presence of a base.

5. The process according to claim 4 wherein the base is bis-(imidazol-1-yl)-thione.

6. The process for preparing a compound of the formula:

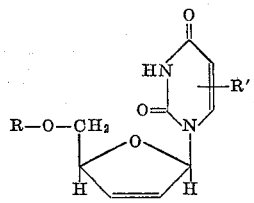

(IV)

wherein R is an acyl radical of the formula $R^2CO-$ where $R^2$ is lower alkyl or phenyl; lower alkyl; or lower alkyl substituted by at least one phenyl group; R' is hydrogen, fluoro, lower alkyl, amino, lower alkylamino, di(lower alkyl)amino or trifluoromethyl, which comprises treating a compound of the formula:

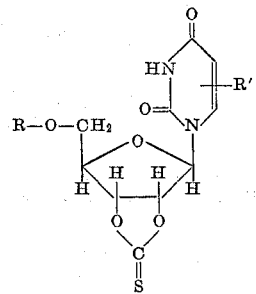

(I)

wherein R and R' are as defined above with Raney nickel.

7. The process for preparing a compound of the formula:

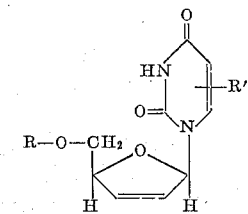

(IV)

wherein R is an acyl radical of the formula $R^2CO-$ where $R^2$ is lower alkyl or phenyl; lower alkyl; or methyl substituted by at least one phenyl group; R' is hydrogen, fluoro, lower alkyl, amino, lower alkylamino, di(lower alkyl)amino or trifluoromethyl, which comprises treating a compound of the formula:

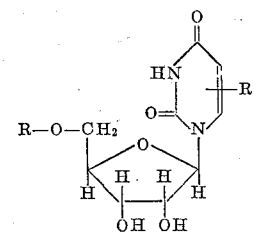

(II)

wherein R and R' are as defined above, with a thionocarbonate generating material to form thereby a thionocarbonate compound of the formula:

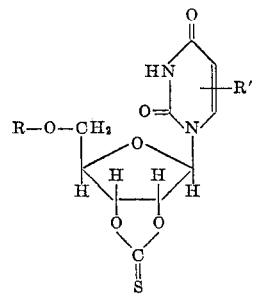

(I)

wherein R and R' are as defined above, and treating said thionocarbonate compound with Raney nickel.

8. The process according to claim 7 wherein the thionocarbonate generating system is bis-(imidazol-1-yl)-thione.

9. The process for preparing a compound of the formula:

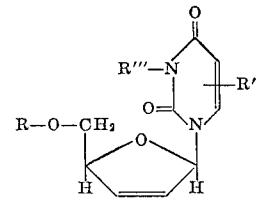

(V)

wherein R is an acyl radical of the formula $R^2CO-$ where $R^2$ is lower alkyl or phenyl; lower alkyl; or methyl substituted by at least one phenyl group; R' is hydrogen, fluoro, lower alkyl, amino, lower alkylamino, di(lower alkyl)amino or trifluoromethyl; and R''' is lower-alkyl, which comprises treating a compound of the formula:

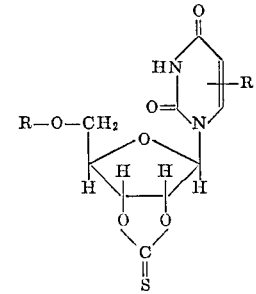

(I)

wherein R and R' are as defined above, with a tri(loweralkyl)phosphite, the lower alkyl group of said tri(loweralkyl)phosphite corresponding to R'''.

10. The process according to claim 9 wherein the tri(lower-alkyl)phosphite is trimethylphosphite.

11. Compounds of the formula:

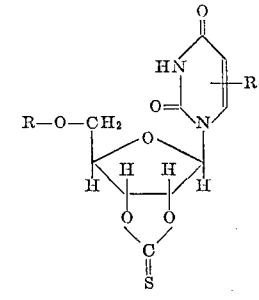

(I)

wherein R is an acyl radical of the formula $R^2CO-$ where $R^2$ is lower alkyl or phenyl; lower alkyl; or methyl substituted by at least one phenyl group; R' is hydrogen, halogen, lower alkyl, amino, lower alkylamino, di(lower alkyl)amino or trifluoromethyl.

12. 1-(5'-O-trityl - $\beta$ - D-ribofuranosyl)-uracil-2',3'-O-thiocarbonate.

13. Compounds of the formula:

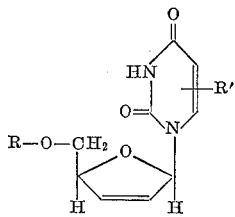

(IV)

wherein R is an acyl radical of the formula $R^2CO-$ where $R^2$ is lower alkyl or phenyl; lower alkyl; or methyl substituted by at least one phenyl group; R' is fluoro, trifluoromethyl, amino, loweralkylamino, di(loweralkyl)amino, or lower alkyl having more than one carbon atom.

14. The compounds of claim 13 wherein R is trityl.
15. The compounds of claim 14 wherein R' is amino.
16. The compounds of claim 14 wherein R' is methylamino or dimethylamino.

17. Compounds of the formula:

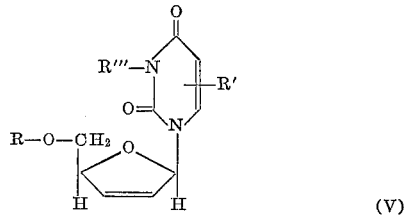

(V)

wherein R is an acyl radical of the formula $R^2CO-$ where $R^2$ is lower alkyl or phenyl; lower alkyl; or methyl substituted by at least one phenyl group; R' is hydrogen, fluoro, lower alkyl, amino, lower alkylamino, di(lower alkyl)amino or trifluoromethyl, and R''' is lower alkyl.

18. Compounds of claim 17 wherein R is trityl.
19. Compounds of claim 18 wherein R''' is methyl.
20. Compound of claim 18 wherein R' is hydrogen.

No references cited.

LEWIS GOTTS, *Primary Examiner.*

JOHNNIE R. BROWN, *Assistant Examiner.*